Sept. 20, 1960     S. ALBERT     2,953,109
SAFETY WEDGE PIN
Filed May 12, 1953
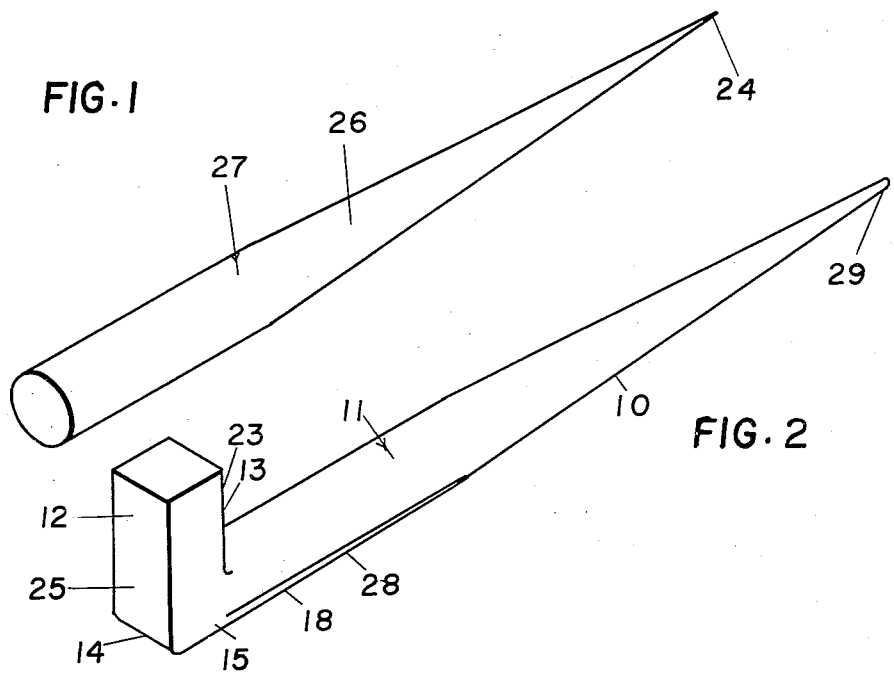
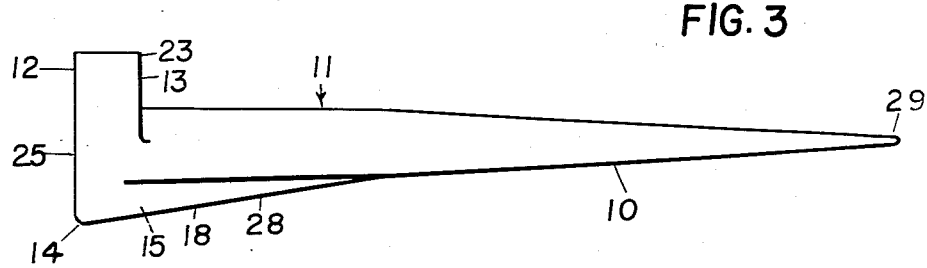
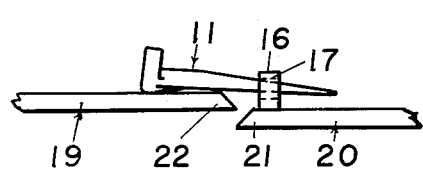
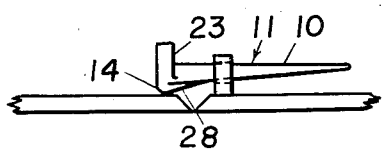
SAMUEL ALBERT
*INVENTOR.*
BY *Harry Langsam*
ATTORNEY

United States Patent Office 2,953,109
Patented Sept. 20, 1960

2,953,109
SAFETY WEDGE PIN

Samuel Albert, 637 Adams Ave., Philadelphia, Pa.

Filed May 12, 1953, Ser. No. 354,589

2 Claims. (Cl. 113—111)

This invention relates to aligning and securing devices, in general, and to devices for temporarily aligning and securing for subsequent joinder operations, in particular.

A wedge pin or bull pin is used for aligning and securing plates, pipes, etc., for welding, riveting, etc., in the fabrication of structural members and in the manufacturing of tanks, towers, etc. To date, bull pins have been simply elongated cones. When necessary, wedges have been used in conjunction with bull pins to obtain a greater displacement necessary for alignment.

Objects of this invention are to provide a bull pin of simple structure that will align more safely and easily and which can be more easily and safely handled and backed out than any other bull pin known.

These objects are, in general, achieved by constructing the wedge pin as shown in Fig. 2 and as described in the following specification.

Fig. 1 is an isometric view of the wedge pins used to date.

Fig. 2 is an isometric view of a wedge pin embodying my invention.

Fig. 3 is a side elevation of the pin shown in Fig. 2.

Fig. 4 is a side elevation of the wedge pin of Fig. 2 in position for aligning the surfaces of two metal plates.

Fig. 5 is the same as Fig. 4 after the metal plates have been aligned.

Referring to Fig. 2, 10 is the conically-shaped shank of the pin 11. The integral head 12 of pin 11 consists of shoulder 13, heel 14 and shank extension 15. The under surface 18 of shank extension 15 is a flat plane which forms an obtuse angle with shank 10. The driving surface of pin 11 consists of heel 14 and shoulder 13. Heel 14 and shank tip 29 are rounded.

To align the metal plates shown in Fig. 4, a threadless nut or holding lug 16 is tack welded on the plate 20 that is to be drawn toward the other plate 19. Nut 16 is simply a bar of metal with a circular hole 17 drilled through it. Shank 10 of pin 11 is inserted into hole 17 with under surface 18 of shank extension 15 resting on plate 19. Pin 11 is driven further in hole 17 by repeated hammer blows on driving surface 25, the top of shank 10 bearing against the top of hole 17, drawing adjacent end 21 of plate 20 up, and the under surface 18 of shank extension 15 bearing against plate 19, pushing adjacent end 22 of plate 19 down. Pin 11 is driven into hole 17 of nut 16 until ends 21 and 22 of plates 20 and 19, respectively, are in the desired position shown in Fig. 5. Said position can be held as long as desired, e.g., until ends 21 and 22 are welded together.

To remove pin 11, inner surface 23 of shoulder 13 is repeatedly struck with a hammer until pin 11 backs out. Nut 16 can be broken off with a sharp hammer blow.

The advantages of the new wedge pin embodying my invention over the old type wedge pin can now be pointed out.

The old type pin requires, in most cases, a wedge to achieve the desired alignment. Care is required in keeping this wedge in place when driving the pin in. Great care is required when driving the pin out, also, or the wedge will fly out, be lost, injure someone or damage property.

The flat under surface 18 of the shank extension 15 guides the pin in straight and in a far more satisfactory manner than the conical surface of the old pin, particularly if the metal plate 19 or the hole 17 is rough in which event the old pin will follow the course of a groove in the metal and, being out of line tends to jam in nut 16.

If the pin is driven in too far and jams in the circular hole 17, the old pin is much harder to remove and frequently must be burned out, as it will contact the hole around its entire circumference, its cross-section being circular. The new pin will jam at only three points, one point on its circumference and the other two points where the edges 28 of flat under surface 18 contact the hole 17 of nut 16; backing out is obviously much easier.

The old pin 27 is removed by striking the small end 24. This tends to bend shank 26 and jams the pin. Burning out is frequently necessary to remove the pin. On the other hand, the new pin is removed, as described above, by striking inner surface 23 of shoulder 13 and no jamming is encountered.

The location of the backing out surface 23 on the same end as the driving surface 25 frequently avoids the necessity of leaning over beams necessary when driving out the old pin. There is also less danger of damaging the work by a glancing hammer blow, the pin being between the driving surface 14 and the work 19.

The flat surfaces of the new pin and the presence of the shoulder enable it to be safely put down with no chance of rolling when not in use and because of the shoulder 13 it can be more safely handled and can be carried in operator's belt; the old pin tends to roll when put down. These advantages are of great importance especially when working at great heights where a falling bull pin can be very dangerous to both life and property.

Other advantages of the new pin are its larger driving area, its lesser tendency to loosen on vibration, there being no necessity for the separate wedge required in most work with the old pin, and the fact that it will not roll when stepped on. The rounded heel 14 and flat under surface 18 of shank extension 15 help prevent gathering of steel when pin 11 is backed out, requiring less force and repair of plate 19.

While the invention has been described with some detail, it is to be understood that the description is for purposes of illustration only and is not definitive of the limits of the inventive idea. The right is reserved to make such changes in the details of construction and arrangement as will fall within the purview of the attached claims.

I claim:

1. A wedge pin comprising a substantially conical shank, the larger end of which is formed into a shoulder extending beyond the periphery of the shank on its top surface, said shank being flat on said under surface, said flat surface forming an obtuse angle with the remainder of said shank.

2. A wedge pin having a substantially conical shank the periphery of said shank adjacent its larger end having a shoulder and a flat surface forming an obtuse angle with the remainder of said shank.

References Cited in the file of this patent

UNITED STATES PATENTS

| | | |
|---|---|---|
| Re. 21,101 | Hiner | May 30, 1939 |
| 900,570 | Morris | Oct. 6, 1908 |
| 963,312 | McKnight | July 5, 1910 |
| 1,909,229 | Smith | May 16, 1933 |
| 2,469,965 | Holt | May 10, 1949 |